June 23, 1942. G. J. FAIRBANKS 2,287,674
AUTOMOBILE HEATER CONTROL APPARATUS
Filed Sept. 8, 1941 2 Sheets-Sheet 1

Inventor.
Gordon J. Fairbanks
By Williamson Bradbury & Hinkle
Attys.

June 23, 1942.  G. J. FAIRBANKS  2,287,674
AUTOMOBILE HEATER CONTROL APPARATUS
Filed Sept. 8, 1941   2 Sheets-Sheet 2
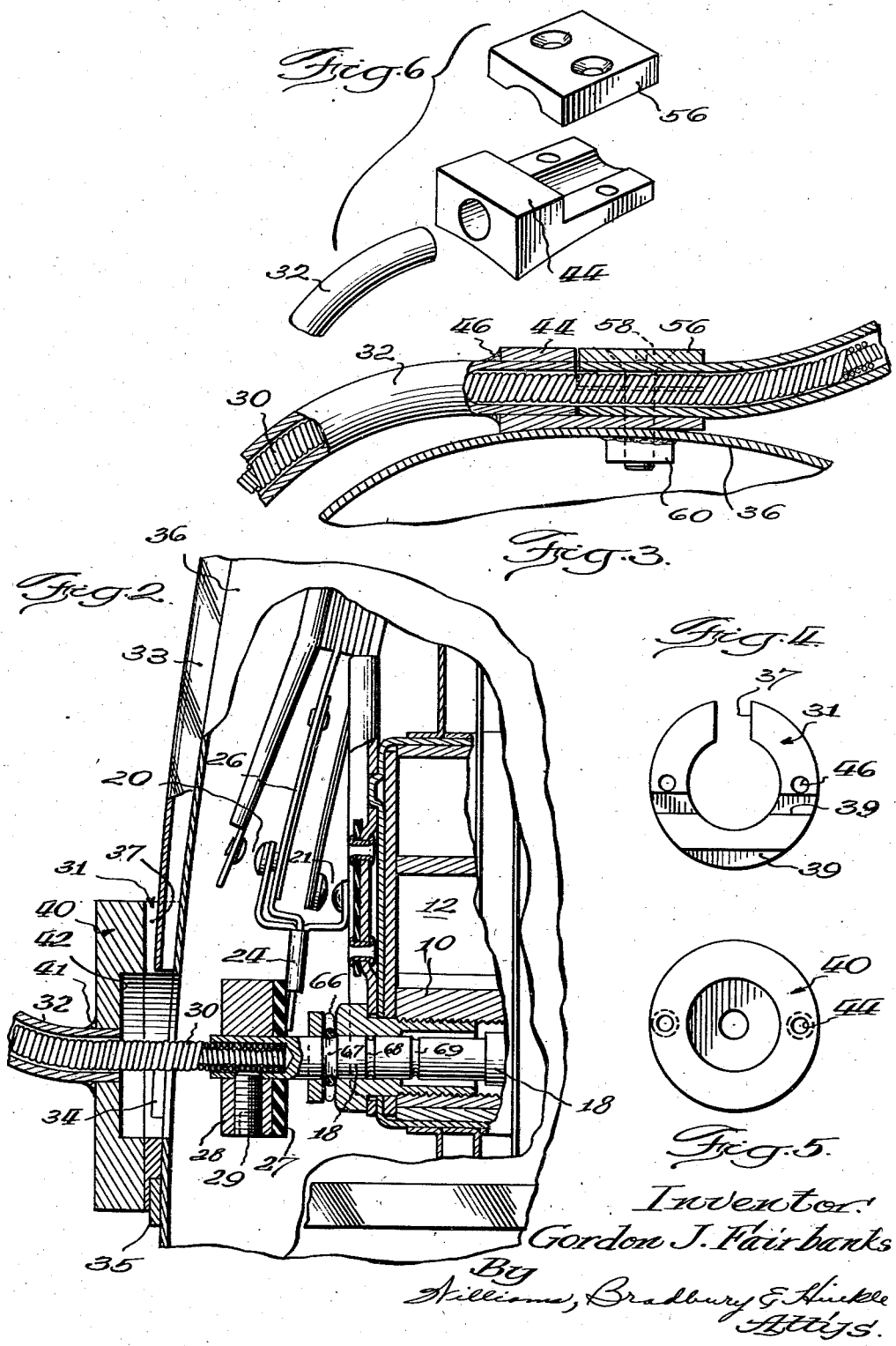
Inventor:
Gordon J. Fairbanks
By Williams, Bradbury & Huckle
Attys.

Patented June 23, 1942

2,287,674

UNITED STATES PATENT OFFICE 2,287,674

AUTOMOBILE HEATER CONTROL APPARATUS

Gordon J. Fairbanks, Chicago, Ill., assignor to Stewart-Warner Corporation, Chicago, Ill., a corporation of Virginia Application September 8, 1941, Serial No. 410,032

3 Claims. (Cl. 237—1)

My invention relates generally to controls for automobile heaters, and particularly to remote controls for heaters of the internal combustion type.

In the installation of internal combustion type heaters upon automobiles, trucks, buses, and the like, it is frequently desirable to locate the heater or heaters in positions in which the usual control button on the heater itself is not readily accessible to the operator of the vehicle. In order to make possible the control of the heater unit by the operator of the vehicle when the heater is located remotely from the operator, or in a position where the operation of the usual control on the heater would distract the operator from his driving duties, I have provided a remote control in which the control button may be located on the instrument panel of the vehicle or in any other position conveniently accessible to the operator for manual operation.

It is thus an object of my invention to provide an improved remote manual control for automobile heaters of the internal combustion type.

A further object is to provide an improved remote control for heaters of the internal combustion type which may be utilized with heaters of otherwise standard construction without material alterations in the heater structure.

Other objects will appear from the following description, reference being had to the accompanying drawings, in which:

Fig. 2 is an enlarged fragmentary sectional view showing the connection of the remote control to the control valve rod of the heater;

Fig. 3 is a fragmentary sectional view showing the method of attachment of the control wire casing to the top of the heater;

Figs. 4 and 5 are plan views of the attachment fittings; and,

Fig. 6 is an exploded view showing the parts illustrated in Fig. 3.

Figure 1:
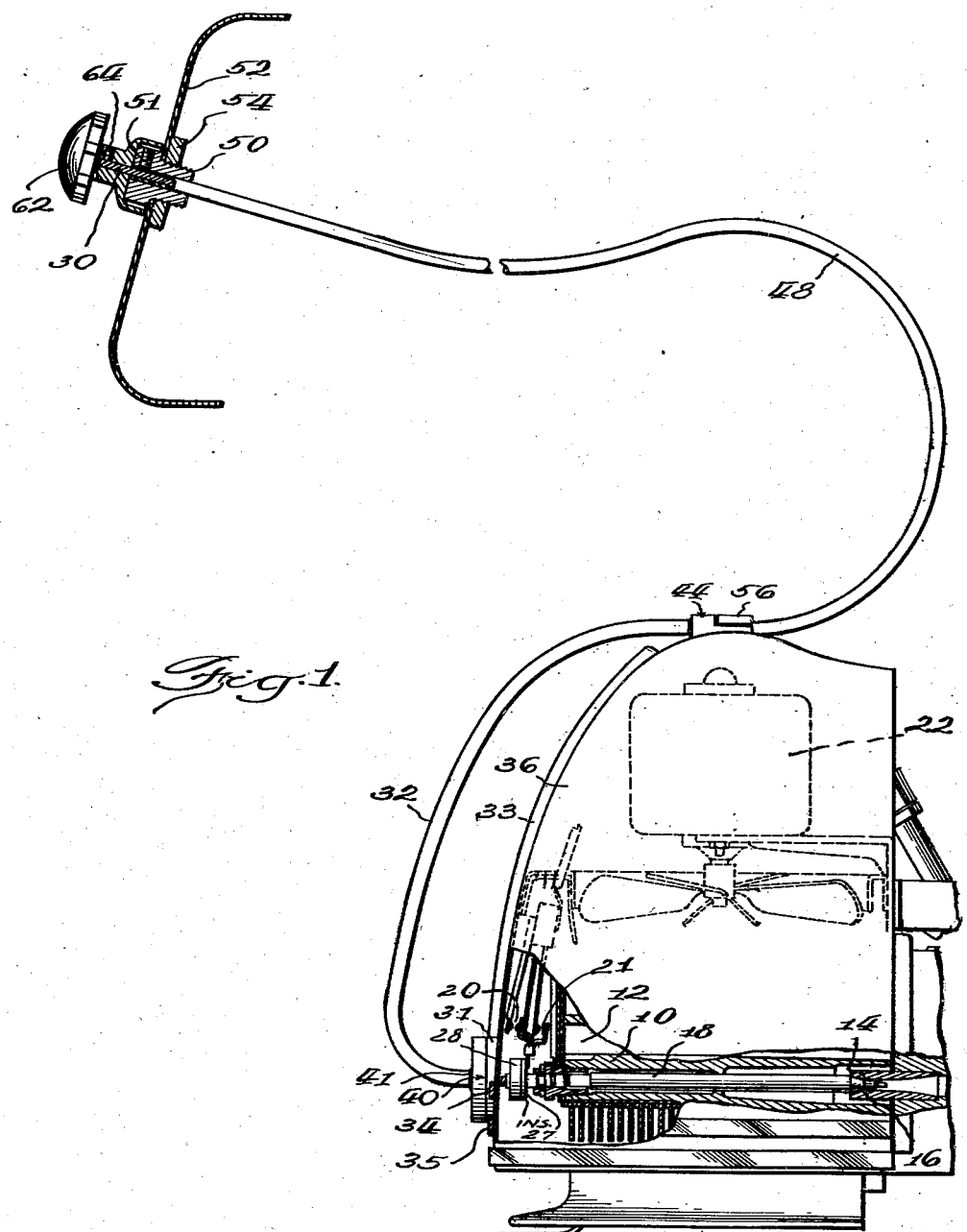
Fig. 1 is a fragmentary sectional view of portions of the heater and the remote control therefor.

The control apparatus is illustrated as applied to a heater of the internal combustion type such as that disclosed, for example, in prior Patents No. 2,177,114 and No. 2,190,671, comprising generally a radiator casting 10 having a circuitous passageway 12 formed therein, the passageway terminating at an outlet valve port 14 adapted to be closed by a valve 16 formed at the end of a valve stem 18.

The valve port 14 is connected to the intake manifold of the automobile engine, the vacuum of which serves as a means to draw the products of combustion through the circuitous passageway 12 so that by moving the valve stem to the left, the valve 16 is opened and the heater thus conditioned for operation. Such opening movement of the valve also results in the proper operation of a pair of switches 20 and 21 which, respectively, control the supply of current to an electrical igniter and a fan motor 22. The switches 20 and 21 are controllable in part by the depending end portion 24 of a switch arm 26. The end portion 24 of the switch arm normally engages an insulating washer 27 which is backed by a collar 28 which is secured to the valve stem 18 by a set screw 29. Thus, when the valve stem 18 is moved to the left (Fig. 2) the resilient switch arm 26, due to its spring bias, will likewise swing to the left to close the switch 20 to initiate operation of the heater.

The set screw 29 serves to secure to the end of the valve stem 18 a flexible cable 30 which is preferably of the type comprising a pair of closely wound spiral wires wound in opposite directions, one over the other. Such flexible cable is capable of transmitting torque in either direction as well as transmitting forces longitudinally of the cable. The cable 30 extends through a rigid metal tube 32, which is suitably formed to avoid abrupt changes in curvature. This tube may be suitably finished to add to the ornamental appearance of the heater.

Heaters of the type illustrated usually have housings provided with ornamental trim beads, such as the beads 33, 34, and 35 shown attached to the housing 36 in Fig. 1. In order that the lower end of the tube 32 may be attached to the housing 36 without disturbing the appearance of these ornamental beads, I provide a mounting plate 31, as shown in Fig. 4, which has a slot 37 to receive the trim bead 33 and grooves 39 to receive the molding beads 34 and 35.

The lower end of the tube 32 extends into a suitable opening formed in an attachment plate 40, and is secured thereto preferably by silver soldering, as indicated at 41. The mounting plates 31 and 40 together form a recess 42 which is sufficiently large to receive the collar 28 when the valve is moved to its open position. The mounting plates 31 and 40 are secured to the housing 36 by countersunk head screws extending through openings 44 and 46 formed in the plates 40 and 31, the screws being threaded in the housing 36.

The upper end of the tube 32 extends into a suitably formed opening in an attachment fitting 44, the lower surface of which is conformed to the contour of the casing 36, the tube being preferably secured to this fitting by silver soldering.

A flexible tube 48 guides the cable from the fitting 44 to a bushing 50, the end of the tube 42 being secured to the bushing by a set screw 51, the bushing 50 being secured to any suitable support, such as an instrument panel 52, by a nut 54. The lower end of the tube 48 is clamped to the attachment fitting 44 by a saddle 56 which, together with the fitting 44, is secured to the housing 36 by a pair of countersunk screws 58 extending through the housing 36 and threaded in nuts 60. The upper end of the cable 30 has a control button 62 secured thereto, as by a set screw 64.

The heater is supplied with the tube 32, attachment plates 31 and 40, as well as the attachment fitting 44, secured in place on the heater. Thus, in making the installation, it is necessary merely to attach the bushing 50 to the instrument panel 52 or other support, extend the cable 30 downwardly through the rigid tube 32 and into the socket formed in the end of the valve stem 18, where it is secured by tightening the set screw 29. The end of the flexible tube 48 may then be inserted between the fitting 44 and the saddle 56 and the latter parts securely clamped to the casing 36. Thereafter, it is necessary merely to secure the control button 62 to the upper end of the cable 30.

In using the control, the operator needs merely to pull the button 62 in order to open the valve 16. Inasmuch as the valve 16 may adhere to its seat 14, due to the accumulation of carbon and other particles, it is desirable that in pulling the valve from its seat it be rotated. Such rotation by the valve relative to its seat has a tendency to clean the cooperating surfaces of these parts, and assure proper functioning of the valve. It is for this reason that it is desirable that the cable 30 be of such construction as to be capable of transmitting torque as well as longitudinal forces. Such rotary movement is also desirable in facilitating the disengagement of a detent spring 66 (Fig. 2) which is adapted to engage in shallow grooves 67, 68, and 69, formed in the valve stem 18 for holding the valve respectively in its off, intermediate, and full-on positions.

From the foregoing it will appear that I have provided a very simple remote control apparatus for automobile heaters which may be easily installed substantially irrespective of the position of the heater with respect to the operator's seat, which permits the heater to be easily controlled, which is of rugged, durable construction, and which enables the operator of the vehicle to effect the control of the heater in a simple and efficient manner.

While I have shown and described a particular embodiment of my invention, it will be apparent to those skilled in the art that numerous variations and modifications may be made in the specific form of the apparatus without departing from the more basic principles of the invention.

I claim:

1. In an automobile heater of the internal combustion type having a reciprocable and rotatable valve for controlling its operation, the combination of a flexible cable having one end secured to said valve, said cable being capable of transmitting torque and longitudinally directed forces, a rigid guiding tube secured to said heater for guiding said flexible cable, a control button positioned remote from said heater, said control button being secured to the other end of said flexible cable, and a flexible tube surrounding and guiding the portion of the flexible cable extending from the heater to the control button.

2. In an automobile heater of the internal combustion type having a casing and a reciprocable and rotatable valve for controlling its operation, said valve having a stem extending rearwardly near the bottom of the heater casing, the combination of a flexible cable having one end secured to said valve stem, said cable being capable of transmitting torque in either direction as well as longitudinally directed forces, a generally U-shaped rigid guiding tube having both ends thereof secured to said casing for guiding said flexible cable, a control button positioned remote from said heater, said control button being secured to the other end of said flexible cable, a flexible tube surrounding and guiding the portion of the flexible cable extending from said casing to the control button, a clamp securing one end of said flexible tube to said casing, and means for detachably securing the other end of said flexible tube to a support in position for convenient operation by the driver of the automobile.

3. In an automobile heater of the internal combustion type having an irregularly shaped casing and a reciprocable valve for controlling its operation, the combination of a flexible cable having one end secured to said valve, said cable being capable of transmitting torque and longitudinally directed forces, a pair of mounting plates conforming to the shape of said casing and secured thereto, a rigid guiding tube having its ends secured to said mounting plates for guiding said flexible cable, a control button positioned remote from said heater, said control button being secured to the other end of said flexible cable, and a flexible tube surrounding and guiding the portion of the flexible cable extending from the heater to the control button, said flexible tube having one end secured to one of said mounting plates and its other end secured to a support adjacent said control button.

GORDON J. FAIRBANKS.